(12) United States Patent
Dugas et al.

(10) Patent No.: US 9,422,033 B2
(45) Date of Patent: Aug. 23, 2016

(54) MOORING CHAIN STOPPING DEVICE AND SYSTEM FOR THE OFFSHORE MOORING OF A BUOYANT STRUCTURE INTO WHICH SUCH A DEVICE IS BUILT

(71) Applicant: CONTROLE MESURE REGULATION, Marseilles (FR)

(72) Inventors: Benoit Dugas, Marseilles (FR); Jean-Claude Lautier, Marseilles (FR)

(73) Assignee: CONTROLE MESURE REGULATION, Marseilles (FR)

( * ) Notice: Subject to any disclaimer, the term of this patent is extended or adjusted under 35 U.S.C. 154(b) by 0 days.

(21) Appl. No.: 14/407,507

(22) PCT Filed: Jun. 12, 2013

(86) PCT No.: PCT/FR2013/051367
§ 371 (c)(1),
(2) Date: Feb. 26, 2015

(87) PCT Pub. No.: WO2013/186488
PCT Pub. Date: Dec. 19, 2013

(65) Prior Publication Data
US 2016/0023720 A1     Jan. 28, 2016

(30) Foreign Application Priority Data
Jun. 12, 2012   (FR) .................................... 12 55475

(51) Int. Cl.
*B63B 21/18*      (2006.01)
*G01L 5/04*       (2006.01)

(52) U.S. Cl.
CPC .. *B63B 21/18* (2013.01); *G01L 5/04* (2013.01)

(58) Field of Classification Search
CPC ................................. B63B 21/18; G01L 5/04

USPC ........................................................... 114/200
See application file for complete search history.

(56) References Cited

U.S. PATENT DOCUMENTS

| | | | |
|---|---|---|---|
| 1,214,745 A * | 2/1917 | Beard et al. .............. | G01G 5/04 177/147 |
| 3,613,517 A | 10/1971 | Bradley et al. | |
| 4,425,056 A | 1/1984 | Hunter | |
| 6,688,814 B2 * | 2/2004 | Wetch ................... | E21B 19/004 166/355 |
| 2003/0155564 A1 | 8/2003 | Fontenot | |
| 2010/0175604 A1 | 7/2010 | Boatman et al. | |

FOREIGN PATENT DOCUMENTS

| | | |
|---|---|---|
| CA | 2019143 | 12/1991 |
| EP | 966396 | 12/1999 |
| GB | 2475081 | 5/2011 |

* cited by examiner

*Primary Examiner* — Stephen Avila
(74) *Attorney, Agent, or Firm* — Pearl Cohen Zedek Latzer Baratz LLP

(57) ABSTRACT

A mooring chain stopping device including a locking housing with a channel inside which a mooring chain slides, and including a connection to a buoyant structure to direct the channel axis to the pulling axis of the chain, the housing having bolts inhibiting sliding of the chain in the channel and a device for measuring tension in the chain built into the locking housing. The measuring device includes a chamber including a deformable shell, and filled with a liquid; a bearing part movably mounted in the locking housing, the bearing placed between the bolts and the chamber, and engaging the shell wall to pressurize the liquid, the bearing arranged so the forces exerted by said mooring chain on the bolts cause the movement of the bearing part and the pressurization of said chamber; and at least one pressure sensor to measure the pressure of the liquid.

15 Claims, 8 Drawing Sheets

MOORING CHAIN STOPPING DEVICE AND SYSTEM FOR THE OFFSHORE MOORING OF A BUOYANT STRUCTURE INTO WHICH SUCH A DEVICE IS BUILT

CROSS-REFERENCE TO RELATED APPLICATIONS

This application is a National Phase Application of PCT International Application No. PCT/FR2013/051367, entitled "MOORING CHAIN STOPPING DEVICE AND SYSTEM FOR THE OFFSHORE MOORING OF A BUOYANT STRUCTURE INTO WHICH SUCH A DEVICE IS BUILT", International Filing Date Jun. 12, 2013, claiming priority of French Patent Application No. 1255475, filed Jun. 12, 2012, all of which are incorporated herein by reference in their entirety.

TECHNICAL FIELD OF THE INVENTION

The present invention relates to a chain stopping device (commonly referred to using the term "Chain Stopper") and a system for the offshore mooring of a buoyant structure into which such a device is built.

The invention relates to the technical field of devices for locking mooring chains for the offshore mooring of buoyant structures such as drilling platforms.

BACKGROUND

With reference to FIG. 1, a system for the offshore mooring of a buoyant structure 1 (for example such as a drilling platform, vessel, wind turbine, etc.) generally comprises at least one mooring chain 2 (or anchoring line) acting as a connection between said buoyant structure and an anchoring point 3 in the sea bed. In practice, the buoyant structure 1 is provided with a multitude of mooring chains 2. The latter are essential for holding the structure 1 in position and for the proper operation of the production process which should be relatively unaffected by the movements of said structure induced by winds, waves, tides or currents.

When the mooring chain 2 is connected to the anchoring point 3, a hauling device 4 fitted on the buoyant structure 1, makes it possible to tension said chain. In practice, the value of this pretension of the chain 2 corresponds to a predefined percentage of the rupture load of said chain. When this value is reached, the chain 2 is locked in position by means of a chain stopping device 5, commonly referred to using the term "Chain Stopper".

In a typical installation, the chain stopping device 5 is installed above the hauling device 4. One or a plurality of pulleys 10 may be provided between the chain stopper 5 and the hauling device 4. With reference to FIG. 2, the chain stopper 5 generally comprises a locking housing 50 provided with a channel 53 inside which the chain 2 is capable of sliding. This housing 50 is connected to the buoyant structure 1 by connection means 51 (shown in FIG. 1), such as a yoke, ball joint or any other hinge system, configured to direct the axis of said channel to the pulling axis A of the chain 2. In this way, the latter systematically applies a tensile or not flexion load. To lock the chain 2 in position, the housing 50 has built-in bolts 52 inhibiting the sliding of said chain in said channel. As a general rule, these bolts 52 are engaged with a link of the chain 2 to hold the link in position. The locking of the chain 2 is in principle unidirectional, the bolts 52 merely preventing the portion of chain situated between the hauling device 6 and the chain stopper 5 from entering the housing 50.

Given that the positioning of the mooring chains 2 is complex, it is important to ensure that they do not break under the effect of excessive strain due to the movements of the buoyant structure 1 induced by winds, waves, tides or currents. The rupture of a mooring chain is liable to destabilize the buoyant structure 1, damage drilling tools or pumping lines and thus shut down production. To prevent this, chain stopping devices generally comprise means for measuring the tension in the mooring chain. It is preferable for these means to measure the tension in the pulling axis of the mooring chain, but without being in direct contact with said chain to prevent any excessive load.

In the patent document EP 0.966.396 (BARDEX ENGINEERING), the measurement means consist of an extensometer associated with the locking housing. More specifically, this extensometer is secured to the outer wall of the housing, in the axis of the channel, i.e. in the pulling axis of the chain. This technical solution is not fully satisfactory. Indeed, the extensometer is in direct contact with the external environment, and particularly the sea and spray, such that particular attention should be paid to the tightness thereof to prevent damage to the electronic components. A further drawback lies in the fact that a sudden movement of the mooring chain is merely needed for the locking housing to abut violently against the buoyant structure and be damaged. A further drawback is associated with the need to re-calibrate the extensometer regularly.

In the patent document US 2010/0175604 (BOATMAN), the measurement means consist of:—either a strain gauge positioned on the locking housing;—or a measurement cell positioned between the bolts and a guide whereon said bolts rest; or a contactless sensor positioned at a trunnion block. The use of a strain gauge or a contactless sensor gives rise to the same disadvantages as those cited in the previous paragraph. The measurement cell is of the "standard" type, and for example described in the patent documents GB 2475081 (ILLINOIS TOOL WORKS) or CA2019143 (MCKENNA).

In the patent document US 2003/0155564 (FONTENOT), the measurement means consist of an electronic sensor or a contactless sensor which also gives rise to reliability and calibration problems.

The patent document U.S. Pat. No. 3,613,517 (BRADLEY) discloses a cell for measuring tensile forces. This cell is presented in the form of an annular piston comprising a cylindrical element mounted telescopically in a basic element. The space between these two elements is filled with fluid. When a force is applied on the movable element, the fluid contained in the space is compressed. The pressure measurement of this fluid makes it possible to deduce the intensity of the force applied on the movable element. This type of cell is complex to produce and involves dealing with tightness problems, particularly using a flexible membrane. In practice, this membrane is particularly fragile and cannot be placed in direct contact with the sea or spray, as salt is liable to damage said membrane irreversibly. The BRADLEY cell is thus unsuitable for measuring the tension of a mooring chain.

SUMMARY

In view of this state of affairs, one aim of the invention is that of securing the measurement of tension in a mooring chain.

A further aim of the invention is that of ensuring the reliability over lifetimes of several years of the measurement of tension in a mooring chain.

A further aim of the invention is that of enhancing the precision of the measurement of tension in a mooring chain.

A further aim of the invention is that of proposing means for measuring the tension of a mooring chain having a simple design and which is easy to install in a chain stopping device.

An additional aim of the invention is that of enhancing safety in a system for the offshore mooring of a buoyant structure.

One embodiment relates to a mooring chain stopping device, comprising: a locking housing (50) provided with a channel (53) inside which a mooring chain (2) is capable of sliding, said housing including a means for connecting to a buoyant structure (1), which is configured to direct the axis of said channel to the pulling axis (A) of said chain, said housing further having built-in bolts (2) that are configured to inhibit the sliding of said chain in said channel; and a means for measuring the tension in said mooring chain, said measuring means being built into said locking housing, characterized in that said measuring means includes: at least one chamber (6) consisting of a deformable, closed shell, said chamber being filled with a liquid; at least one bearing part (7) movably mounted in the locking housing (50), said bearing part being placed between the bolts (52) and the chamber (6), said bearing part engaging with the wall of the shell of said chamber so as to pressurize the liquid contained therein, said bearing part being arranged such that the forces exerted by said mooring chain (2) on said bolts (52) causes the movement of said bearing part and the pressurization of said chamber; and at least one pressure sensor (8) configured to measure the pressure of the liquid in said closed chamber (6).

The solution proposed by the invention is a mooring chain stopping device of the type described above, particularly comprising:

a locking housing provided with a channel inside which a mooring chain is capable of sliding, said housing including means for connecting to a buoyant structure, which is configured to direct the axis of said channel to the pulling axis of said chain, said housing further having built-in bolts that are configured to inhibit the sliding of said chain in said channel, means for measuring the tension in said mooring chain, said measurement means being built into said locking housing.

This device is characterized in that the measurement means include:

at least one chamber consisting of a deformable, closed shell, said chamber being filled with a liquid, at least one bearing part movably mounted in the locking housing, said bearing part being placed between the bolts and the chamber, said bearing part engaging with the wall of the shell of said chamber so as to pressurize the liquid contained therein, said bearing part being arranged such that the forces exerted by said mooring chain on said bolts cause the movement of said bearing part and the pressurization of said chamber, at least one pressure sensor configured to measure the pressure of the liquid in said closed chamber.

The use of such a deformable closed chamber as a force measurement element avoids the use of relatively fragile electronic components and thus eliminates any problem associated with the tight protection of the measurement means. Furthermore, due to the simple design thereof and the intrinsic tightness thereof, this chamber is inexpensive to manufacture, simple to use and does not require any particular maintenance in a hostile environment such as the marine environment.

Furthermore, given that, on one hand, the movement of the bearing part is very slight due to the quasi-incompressibility of the fluid contained in the closed chamber, and, on the other, the shell of this chamber is sufficiently flexible to be deformable without any noteworthy force, the pressure exerted by said part on the closed chamber is directly proportional to the tensile force of said chain. The minuscule movement of the bearing part is directly dependent on the force exerted by the mooring chain on the bolts. Therefore, a very high precision of the measurement of the tension in the chain is obtained.

Further distinctive features of the chain stopping device according to the invention are listed hereinafter, each of these features optionally being considered alone or in combination, independently of the distinctive features defined above:

The bolts preferentially engage directly with the bearing part, the latter being configured to transfer, onto the wall of the shell of the deformable closed chamber, the forces exerted by the mooring chain on said bolts.

The shell of the chamber is preferentially thicker at the wall with which the bearing part engages.

The shell of the deformable closed chamber may be presented in the form of a closed annular body arranged inside or around the channel of the locking housing such that the axis of said body is coaxial with the axis of said channel.

In a further alternative embodiment, the shell of the deformable closed chamber is presented in the form of an open annular body arranged inside or around the channel of the locking housing such that the axis of said body is coaxial with the axis of said channel, the opening of said annular body being sized to allow the passage of a link of the mooring chain.

The shell of the deformable closed chamber is advantageously flat, the height of the cross-section of the annular body being less than the width of said cross-section.

The shell of the chamber is advantageously formed by two identical embossed metal sheets, each having an inner shoulder and an outer shoulder, said chamber being obtained by arranging the two metal sheets facing each other and welding and/or riveting the inner and outer shoulders.

The bearing part may move in the locking housing so as to exert, on the wall of the shell of the closed chamber, a pressure force directed in a parallel direction to the axis of the channel.

In one alternative embodiment, the bearing part moves in the locking housing so as to exert, on the wall of the shell of the closed chamber, a pressure force directed in a perpendicular direction to the axis of the channel.

Advantageously, at least three pressure measurement points are distributed homogeneously on the wall of the shell of the closed chamber.

The shell of the deformable closed chamber may comprise at least one vent for degassing said chamber when filling said chamber with liquid.

The chamber is preferentially filled with a pressurized liquid so as to maintain a residual pressure in said chamber after the filling thereof.

In one alternative embodiment, the measurement means comprise a plurality of chambers consisting of deformable closed shells, each of the shells of these chamber optionally being in the form of a portion of annular body arranged inside or around the channel of the housing.

A further aspect of the invention relates to a system for the offshore mooring of a buoyant structure comprising:

at least one mooring chain intended to act as a connection between said buoyant structure and an anchoring point in the sea bed, a chain stopping device positioned on said buoyant structure, said device comprising a locking housing provided with a channel inside which a mooring chain slides, said housing being connected to said buoyant structure by connection means configured to direct the axis of said channel to the pulling axis of said chain, said housing further having built-in bolts inhibiting the sliding of said chain in said channel, means for measuring the tension in said mooring chain, said measurement means being associated with said locking housing.

This system is characterized in that the measurement means include:

at least one chamber consisting of a deformable, closed shell, said chamber being filled with a liquid, at least one bearing part movably mounted in the locking housing, said bearing part being placed between the bolts and the chamber, said bearing part engaging with the wall of the shell of said chamber so as to pressurize the liquid contained therein, said bearing part being arranged such that the forces exerted by said mooring chain on said bolts cause the movement of said bearing part and the pressurization of said chamber, at least one pressure sensor configured to measure the pressure of the liquid in said closed chamber.

According to one advantageous feature of this system, the bolts engage directly with the bearing part, the latter being configured to transfer, onto the wall of the shell of the deformable closed chamber and in the pulling axis of the mooring chain, the forces exerted by said chain on said bolts.

DESCRIPTION OF THE FIGURES

Further advantages and features of the invention will emerge more clearly on reading the description of a preferred embodiment hereinafter, with reference to the appended figures, by way of indicative and non-limiting examples, and wherein.

DETAILED DESCRIPTION

Figure 1:
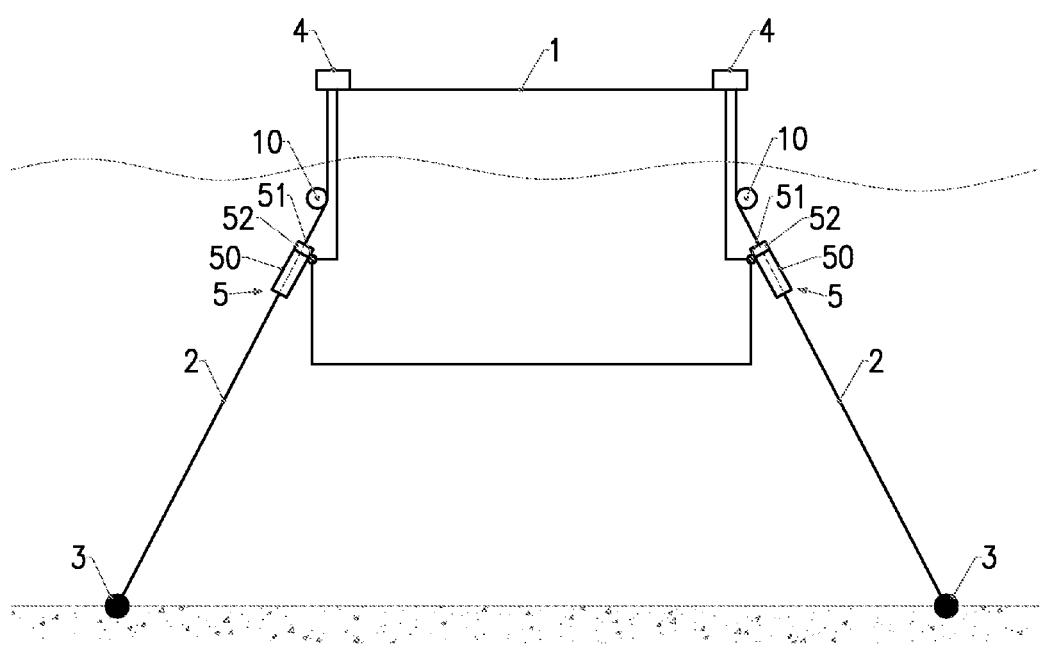
FIG. 1 cited above schematically represents a buoyant structure equipped with an offshore mooring system, FIG. 2 cited above is a sectional view of a chain stopping device known from the prior art.
Figure 2:
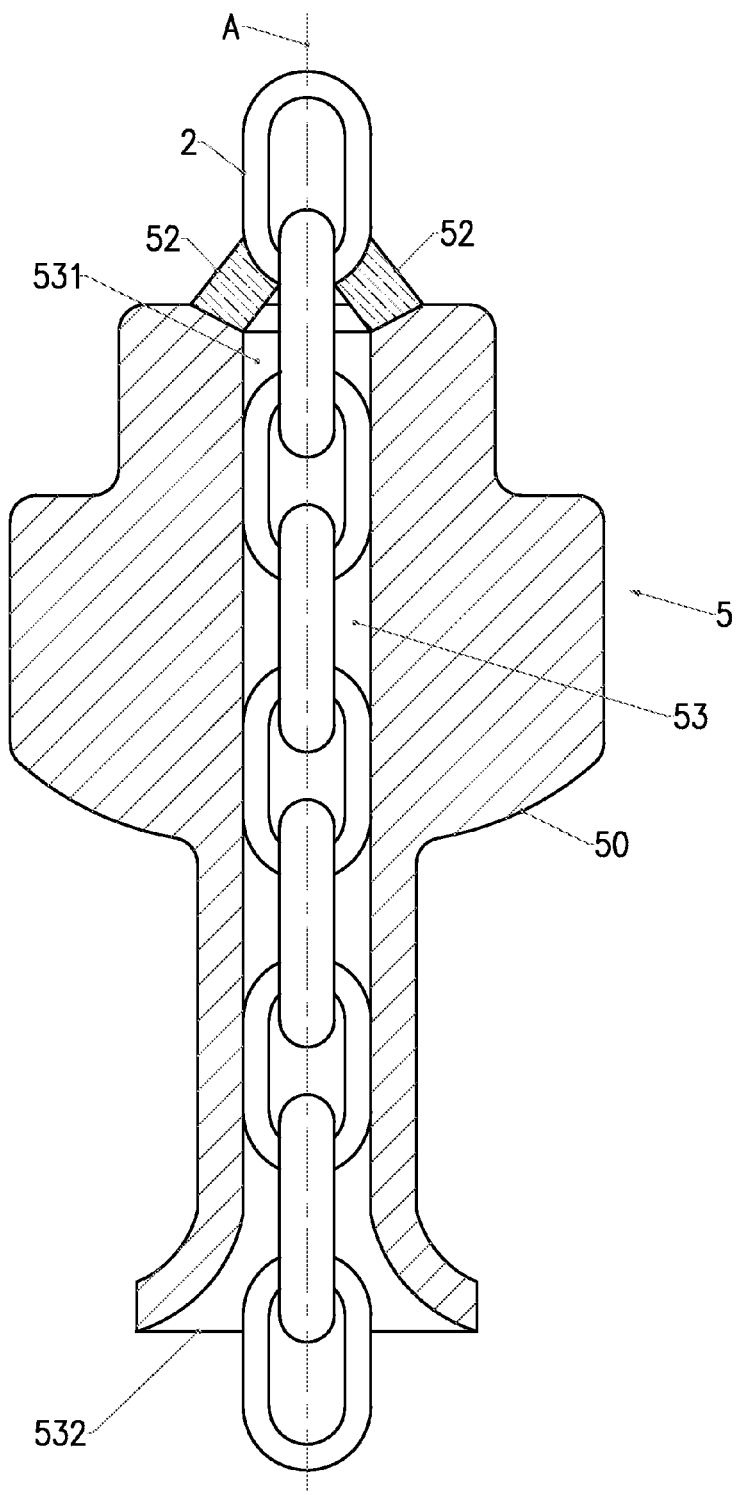
Figure 3:
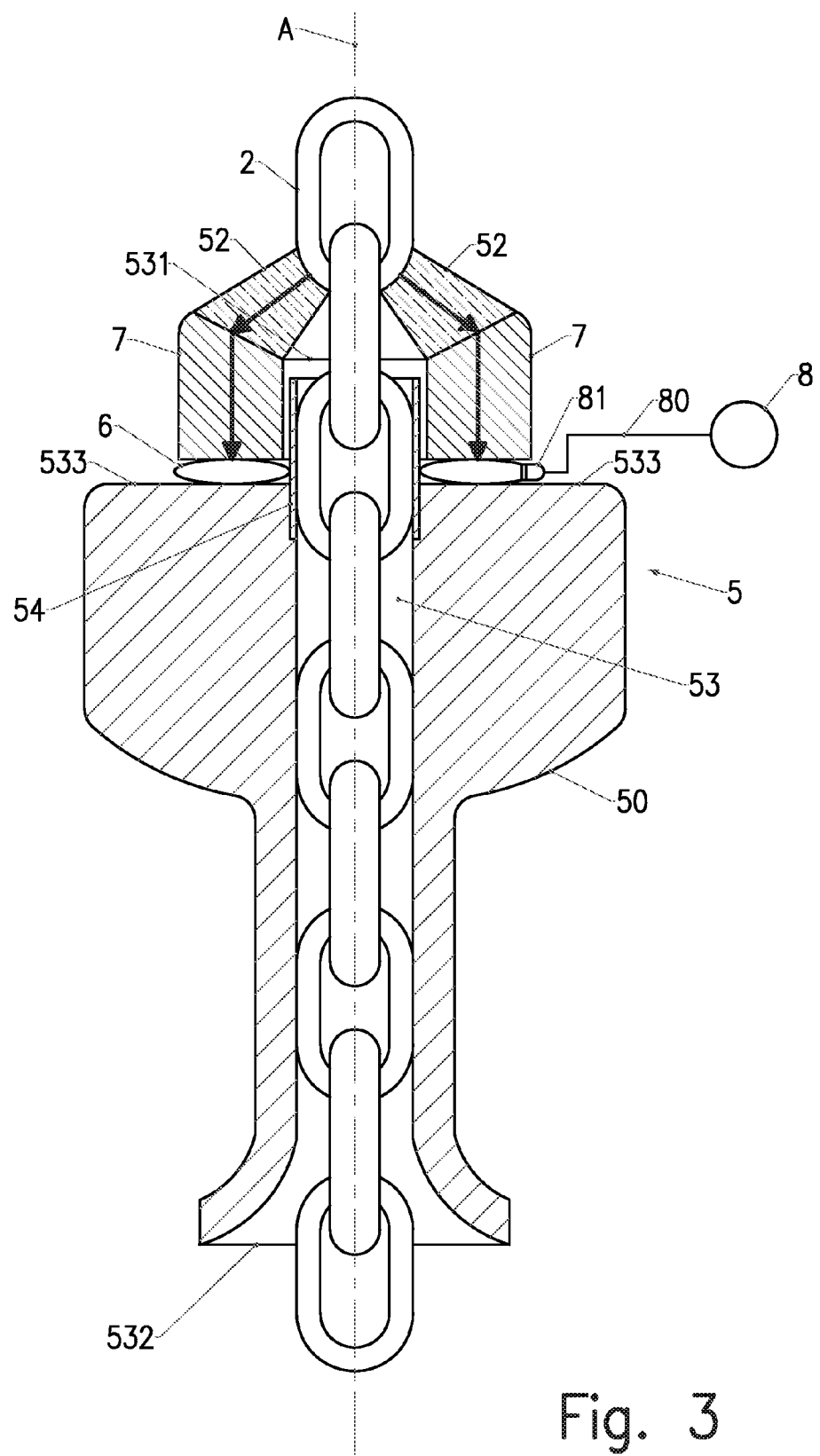
FIG. 3 is a sectional view of a chain stopping device according to the invention, according to one preferred embodiment.

With reference to FIG. 3, the chain stopping device 5 is of the type described above. It comprises a locking housing 50 for example made of stainless steel. This housing 50 comprises a channel 53 inside which the mooring chain 2 passes. The channel 53 is configured to allow sliding of the chain 2 while minimizing any radial play of said chain in said channel. In practice, the diameter of the channel 53 corresponds substantially to the width of the links of the chain 2. The channel 53 is preferentially elongated, the length thereof being greater than the diameter thereof. By way of example, the diameter thereof is between 20 cm and 1 m, and the length thereof between 1 m and 2 m. The proximal end 531 of the channel 53 is provided with bolts 52 described in detail hereinafter in the description. The distal end 532 thereof acts as a guide for limiting the friction of the chain 2 of the exit from the housing 50. The channel 53 may comprise inner grooves wherein the links of the chain 2 are engaged, so as to ensure that said links are directed correctly in said channel.

The housing 50 is connected to the buoyant structure by connection means having a plurality of axes of rotation, for example such as a yoke, ball joint or any other hinge system, and suitable for directing the axis of the channel 53 to the pulling axis A of the chain 2. The axis of the channel 53 is thus continuously aligned with the pulling axis A of the chain 2. In practice, the distal end 532 of the channel 53 is removed from this hinge system to ensure that the chain 2 is only pulled in said channel, particularly at the bolts 52.

The bolts 52 are positioned at the proximal end 531 of the channel 53. They engage with at least one of the links of the chain 2 so as to inhibit the sliding of said chain in the channel 53. The portion of chain situated upstream from the bolts 52 thus cannot enter inside the channel 53 while the portion of chain situated downstream from said bolts can come out of said channel at the end 531. In fact, the locking of the chain 2 is performed in one direction and one way. However, it is possible to envisage using bolts 52 configured to lock the chain 2 in one direction and two ways.

In practice, the bolts 52 are hinged on an axis and/or retractably mounted in the housing 50. They are movable between a locking position where they engage with at least one link of the chain 2 (FIG. 3) and an unlocking position (not shown) where they are disengaged from said link to allow said chain to slide freely in the channel 53. The actuation mechanism of the bolts 52 is of the known type and for example described in the document EP 0.966.369 cited above to which those skilled in the art may refer.

According to the invention, and as seen clearly from FIG. 3, a chamber consisting of a deformable closed shell 6 filled with an incompressible or quasi-incompressible fluid, more particularly a liquid, is built into the housing 50. The term "closed" denotes according to the present invention that the chamber 6 is tight, the liquid not being capable of flowing outside said chamber when it is deformed. There is thus no need to deal with tightness problems associated with any leaks, unlike piston systems. The shell of the chamber 6 is preferentially made from a material such as stainless steel or chrome steel. The liquid (i.e. in physical terms, wherein the volume does not vary or varies very little under the effect of pressure) is for example water, oil, ethylene glycol, or a mixture thereof. Preferentially, this fluid fills the chamber 6 entirely so as to remove any air volume in said chamber.

In the figures appended, all the walls of the shell of the chamber 6 are deformable. With reference to the examples illustrated in FIGS. 4 and 7, the wall 63 whereon the parts 7, 7' bear is preferentially non-deformable so as to optimize the transfer of pressure forces from the parts 7, 7' inside the chamber 6, by means of a bearing surface of constant area. This wall 63 may for example be thicker than the side walls 64, said side walls providing the flexibility of the shell of the chamber 6 due to the smaller thickness and/or the configuration thereof.

Figure 4:
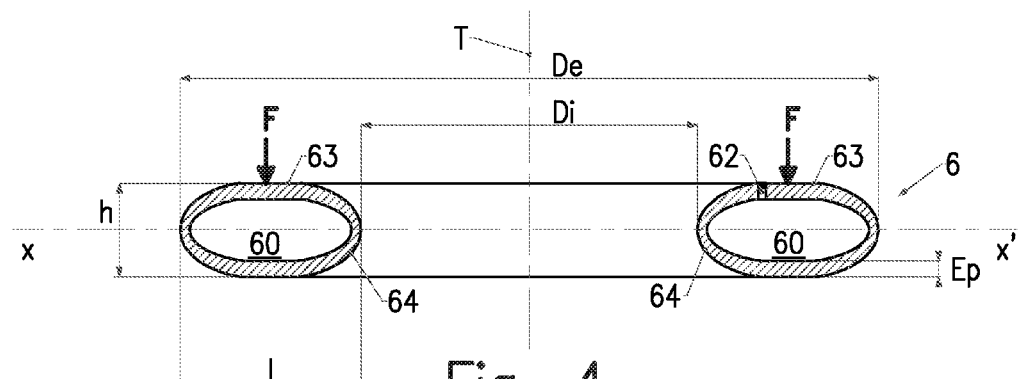
FIG. 4 is a sectional view of a deformable closed chamber according to the invention, in one preferred embodiment.
Figure 7:
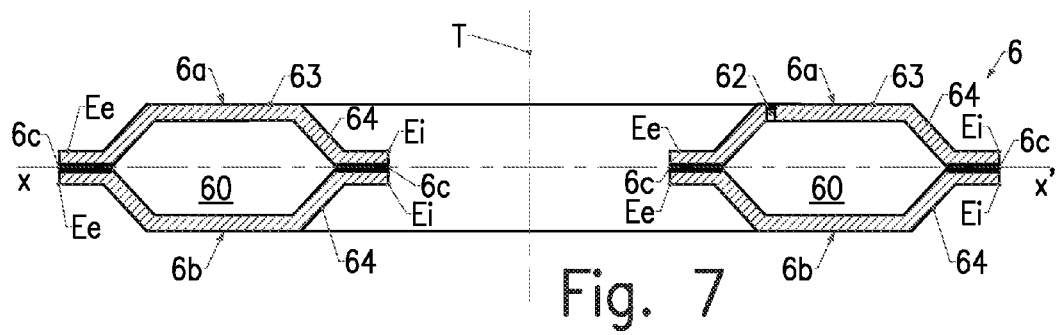
FIG. 7 is a sectional view of a deformable closed chamber according to the invention, in one alternative embodiment.

As illustrated in FIGS. 4 and 7, the shell of the chamber 6 comprises at least one vent 62 for degassing said chamber when filling said chamber with the liquid. This vent 62 is presented in the form of a tube opening at one end inside the chamber 6 and at the other outside said chamber, preferentially at a non-deformable area of the shell, for example at the wall 63 cited above, so as to limit tightness problems. This tube 62 (and that—not shown—used for filling) is sealed using a cap with metal-metal tightness, and an attachment by low heat dispersion welding at a distance from the liquid. The cap is configured, for example in a cone, to generate a slight reduction in the volume of the chamber 6 when positioned, and maintain a residual pressure in said chamber. Alternatively or additionally, the chamber 6 is advantageously filled with a pressurized liquid so as to maintain a residual pressure in said chamber after the filling thereof. This residual pressure is suitable for pre-straining the shell of the chamber 6. It is thus possible to mechanically relieve the shell when under a load, the residual pressure inhibiting the mechanical strain exerted by the parts 7, 7'.

Figure 5:
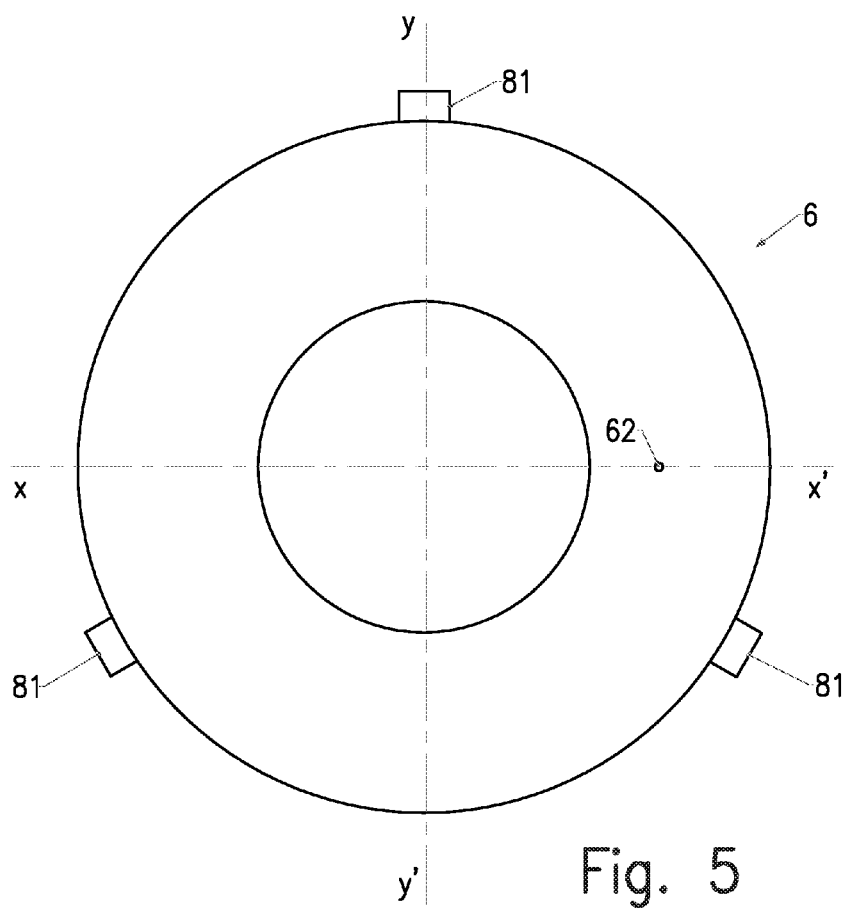
FIG. 5 is a top view of the deformable closed chamber according to FIG. 4.

According to the preferred embodiment schematically represented in FIGS. 3, 4 and 5, the shell of the chamber 6 is presented in the form of a closed annular body arranged inside or around the channel 53 so that the axis T of said body is coaxial with the axis of said channel and thus with the pulling axis A of the chain 2. The annular body is preferentially obtained by fully rotating a plane closed curve (or cross-section) about the axis T. In practice, the housing 50 has a circular shoulder 533 whereon the shell of the toroidal chamber 6 rests. The liquid fills the inner space 60 of the body. With a view to limiting the size of the chamber 6, it is preferred to use a flat annular body, i.e. wherein the height h of the cross-section is less than the width l thereof. In the example of an embodiment in FIGS. 4 and 5, the annular body has a substantially oval cross-section, the bearing surfaces (whereon the tensile forces F of the chain 2 are exerted and suitable for pressurizing the chamber 6) being plane so as to ensure linear contact with the bearing parts 7, 7', or, failing that, a plane contact, preferably having a constant area. The annular body has an external diameter $D_e$ varying from 40 cm to 1.5 m, an internal diameter $D_i$ varying from 20 cm to 1 m, a height h between 5 mm and 10 cm and a thickness $E_p$ between 2 mm and 2 cm, or greater than 2 cm (for example 4 cm) on some portion of the annular body. Indeed, this thickness Ep is not necessarily constant. On the contrary, as mentioned above, the thickness of the wall 63 is preferentially greater than that of the side walls 64, such that: the wall 63 is not deformed,—the side walls 64 provide the flexibility of the shell. An annular body having a substantially oval cross-section, made of stainless steel, having an external diameter $D_e$ of approximately 1 m, an internal diameter $D_i$ of approximately 60 cm, a height h of approximately 30 mm and a thickness $E_p$ of approximately 10 mm, is capable of withstanding an axial force F of approximately 3000 metric tons. In practice, the internal diameter $D_i$ corresponds substantially to the diameter of the channel 53 such that the chain 2 can slide inside the annular body.

Figure 6A:
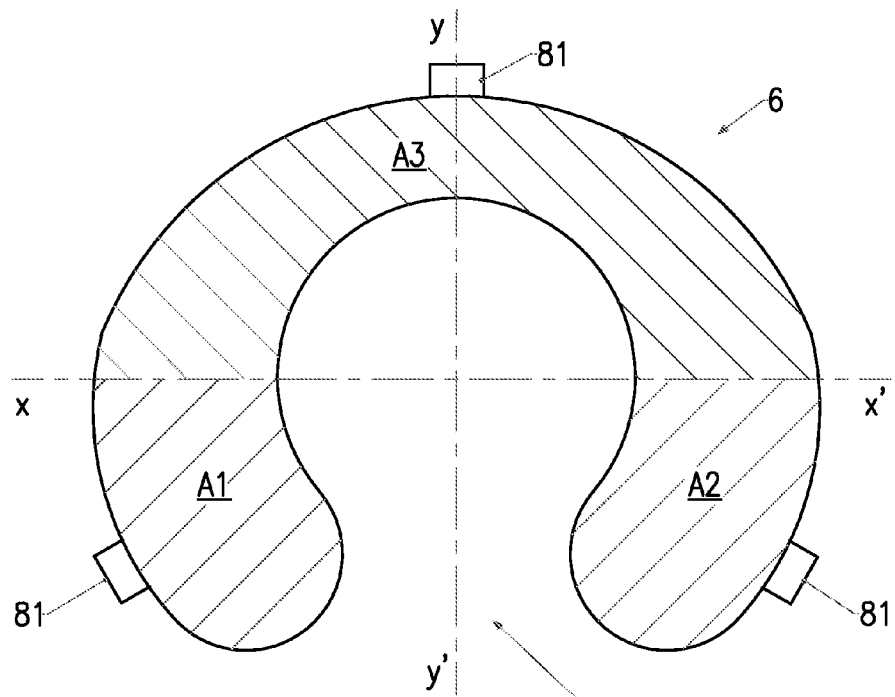
FIG. 6A is a top view of a deformable closed chamber according to the invention, in one alternative embodiment.

In the alternative embodiment in FIG. 6A, the shell of the chamber 6 is presented in the form of an open annular body, i.e. obtained by partial rotation of a plane closed curve (or cross-section) about the axis T. It is noted that the cross-section of this annular body is not necessarily constant. Indeed, it is preferable to size this annular body such that the bearing surfaces A1, A2, A3 are relatively symmetrical in relation to the radial axes X-X' and Y-Y' (which are orthogonal to the axis T) and tend to balance said bearing surfaces so that A1=A2=A3. In this way, a satisfactory, homogeneous distribution of the bearing forces on each bearing surface A1, A2, A3 is ensured. The opening 61 is sized to allow a link of the chain 2 to pass. In practice, the opening 61 is slightly wider than the thickness of the links of the chain 2. The chamber 6 may thus be readily positioned or removed from the channel 53, while leaving the chain 2 inserted in the housing 50. As described above, this portion of annular body is arranged inside or around the channel 53 such that the axis T of said annular body is coaxial with said channel and thus with the pulling axis A of the chain 2.

Figure 6B:
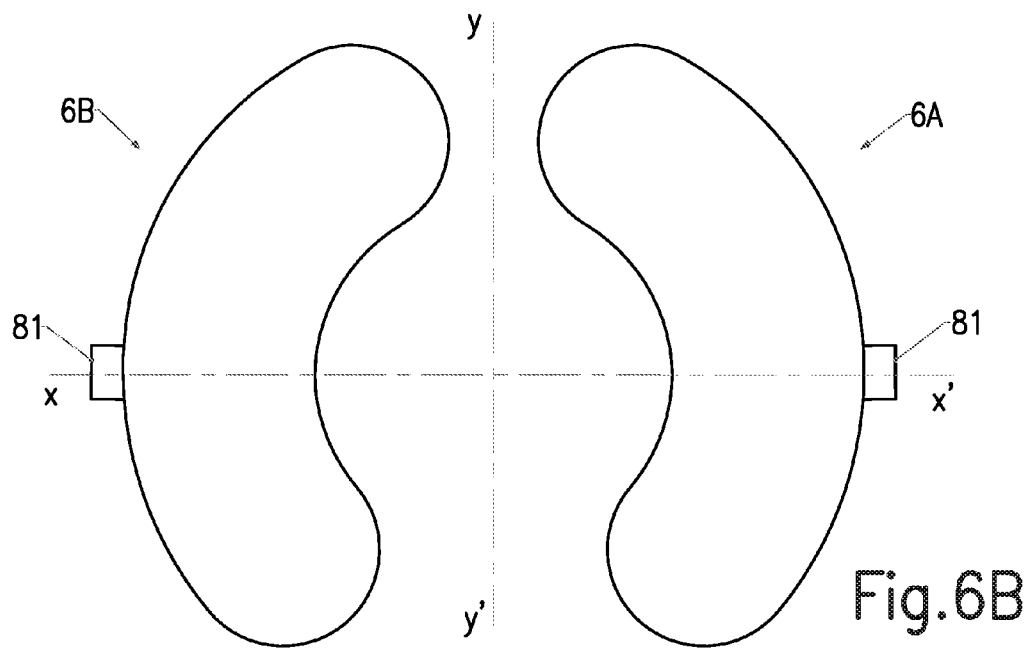
FIG. 6B is a top view of an arrangement of two deformable closed chambers according to the invention.

In the alternative embodiment in FIG. 6B, a plurality of chambers 6A, 6B consisting of deformable closed shells are provided. Each of the shells of the chambers is presented in the form of a portion of annular body arranged inside or around the channel 53 of the housing. In FIG. 6B, two closed chambers are provided, but a greater number may be envisaged. All the chambers 6A, 6B are identical and distributed homogeneously in or around the channel 53. This multi-chamber design further facilitates the positioning of the measurements means in or around the channel 53 whereas the chain 2 is in position in said channel.

Figure 8:
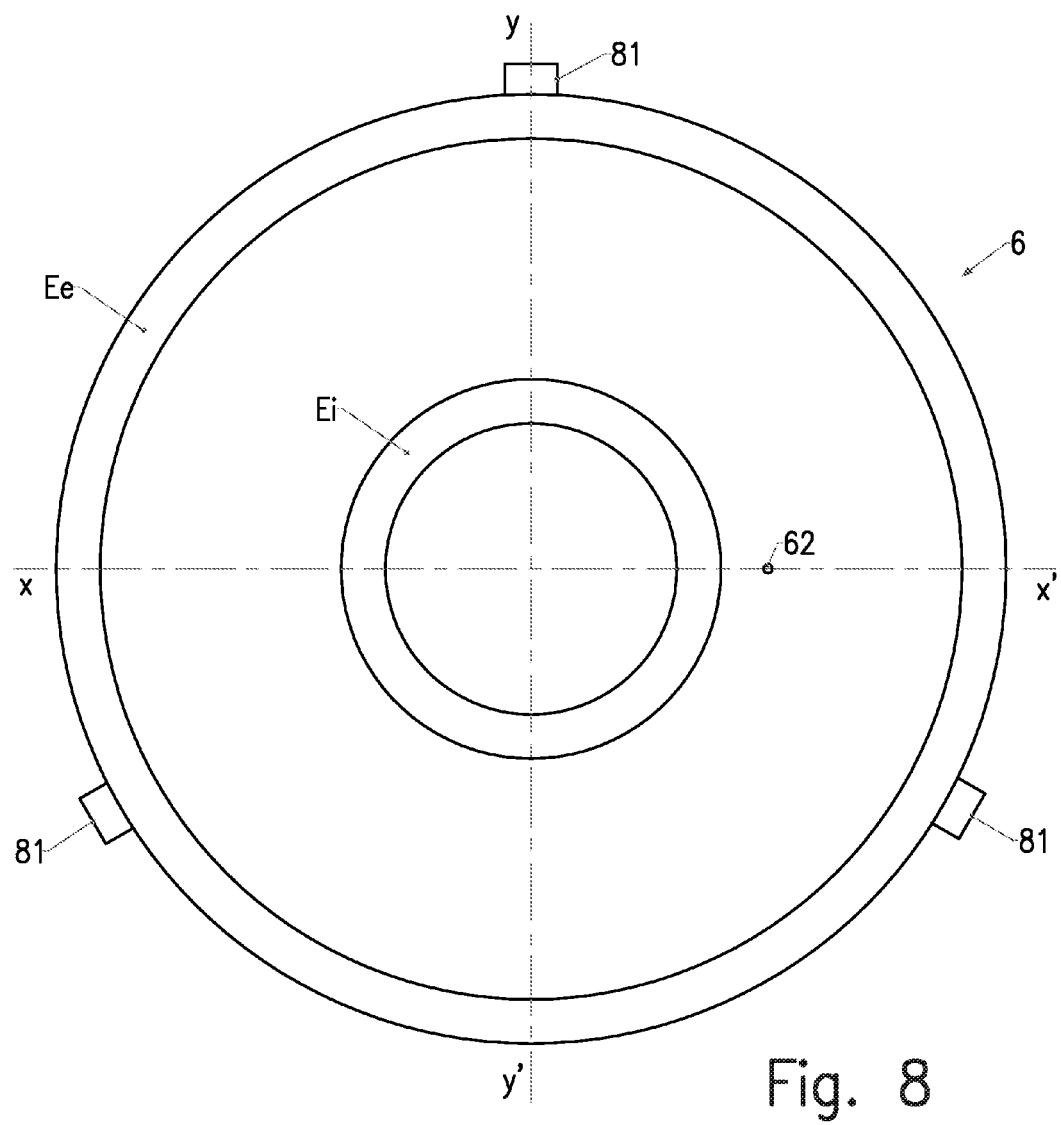
FIG. 8 is a top view of the deformable closed chamber according to FIG. 7.

In the alternative embodiment in FIGS. 7 and 8, the shell of the chamber 6 is formed by two identical embossed metal sheets 6a, 6b, each having an inner shoulder $E_i$ and an outer shoulder $E_e$. The chamber 6 is obtained by arranging the two metal sheets 6a, 6b facing each other and welding and/or riveting the inner $E_i$ and outer $E_e$ shoulders. A seal 6c may optionally be inserted at the junction of the two metal sheets 6a, 6b. However, a mechanically welded structure is perfectly suitable, without needing to provide further specific sealing. For the same reasons as those mentioned above, the metal sheets 6a and/or 6b are thicker at the wall 63 with which the bearing part 7, 7' engages than at the side walls 64.

According to one advantageous feature of the invention, at least one bearing part 7, 7' engages with a wall 63 of the shell of the chamber 6 so as to pressurize the liquid contained therein. This part 7, 7' is movably mounted in the housing 50. It is placed between the bolts 52 and the chamber 6. It is arranged such that the forces (schematically represented by the arrows in bold type) exerted by the chain 2 on the bolts 52 induce the movement of said bearing part and the pressurization of the chamber 6, by engaging with the wall 63 of the shell thereof. The chain 2 thus does not engage directly with the shell of the chamber 6. In practice, the part 7, 7' engages with the wall 63 of the shell of the chamber 6 which has the largest surface area.

In FIG. 3, the bearing part 7 moves so as to exert, on the wall 63 of the shell of the chamber 6, a pressure force directed in a parallel direction to the axis of the channel 52 and thus parallel to the pulling axis A of the chain 2. The bearing part 7 is slidably mounted along the axis of said channel and thus along the pulling axis A of the chain 2. The shell of the chamber 6 is thus positioned in the housing 50 such that the forces absorbed by the bolts 52 are transmitted to the wall 63 along the pulling direction of the chain 2. The bearing part 7 may be presented in the form of a hollow cylindrical part wherein the internal diameter corresponds substantially to the diameter of the channel 53 (or to the internal diameter of the shell of the chamber 6) and wherein the external diameter may correspond to the external diameter of said shell. In practice, the bearing part 7 does not rub radially against any other part so as not to disturb the measurements. A mere guiding part 54 arranged in the channel 53 centers the bearing part 7 in relation to the axis of the chain 2 and that of said channel, with some play. The height of this part corresponds substantially to the distance separating the bolts 52 of the chamber 6. In practice, the bolts 52 engage directly with the proximal end of the bearing part 7. This proximal end is beveled such that the forces are transferred perpendicular to the axis of the channel 53 and perpendicular to the pulling axis A of the chain 2. The distal end of the part 7 engages directly with the wall 63 of the shell of the chamber 6, said chamber being deformed and pressurizing the liquid contained therein. Any other configuration of the bearing part 7 suitable for transferring, on the wall 63 of the shell of the chamber 6 and in the axis of the channel 53 (or the pulling axis A of the chain 2), the forces exerted by said chain on the bolts 52 may be envisaged by those skilled in the art. In practice, the axis of rotation of the bolts 52 is rigidly connected to the bearing part 7: the forces exerted by the chain 2 on said bolts are transferred in the axis of rotation and then in said bearing part. In a further alternative embodiment not shown, the bolts 52 may induce the movement of the bearing part 7 and the pressurization of the chamber 6, by engaging with an intermediate part arranged between said bearing part and said bolts. According to a further alternative embodiment not shown, the axis of rotation of the bolts 52 may be directly attached to the wall of the shell of the chamber 6. In the latter case, the axes of rotation act as the bearing part.

Figure 9:
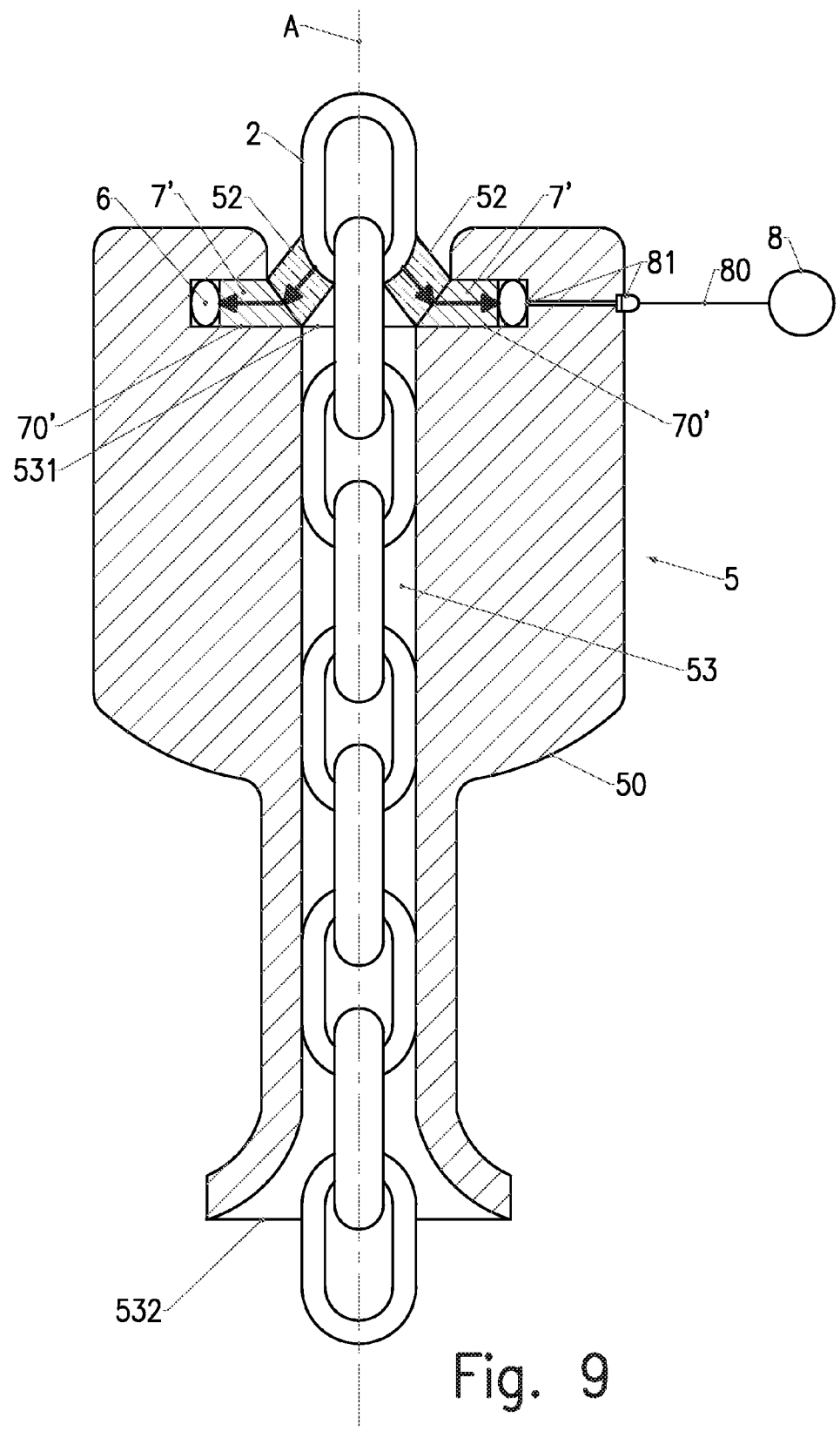
FIG. 9 is a sectional view of a chain stopping device according to the invention, in one alternative embodiment.

In an alternative embodiment illustrated in FIG. 9, the bearing part 7' moves in the housing 50 so as to exert, on the wall 63 of the shell of the chamber 6, a pressure force directed in a perpendicular direction to the axis of the channel 52 and thus perpendicular to the pulling axis A of the chain 2. For this purpose, the bearing part 7' is slidably mounted in the channel 53, perpendicular to the axis of said channel and thus perpendicular to the pulling axis A of the chain 2. The shell of the chamber 6 is thus positioned in the housing 50 such that the forces absorbed by the bolts 52 are transmitted to the wall 63, perpendicular to the pulling direction of the chain 2. The bearing part 7' may be presented in the form of a plurality of studs moving radially in recesses 70' created in the housing 50. These recesses open into the channel 53, at the bolts 52. The other end is closed and receives the shell of the chamber 6. To limit friction, the recesses 70' are advantageously provided with bearings. In practice, the bolts 52 engage directly with the proximal end of the bearing part 7'. This proximal end is beveled such that the forces are transferred perpendicular to the axis of the channel 53 and perpendicular to the pulling axis A of the chain 2. The distal end of the part 7' engages directly with the wall 63 of the shell of the chamber 6. Any other configuration of the bearing part 7' suitable for transferring, on the wall 63, perpendicular to the axis of the channel 53 (or the pulling axis A of the chain 2), the forces exerted by said chain on the bolts 52, may be envisaged by those skilled in the art. It may for example be envisaged to rigidly connect the axis of rotation of the bolts 52 on the bearing part 7': the forces exerted by the chain 2 on said bolts are transferred perpendicular to the axis of rotation and then in said bearing part. In a further alternative embodiment not shown, the bolts 52 may induce the movement of the bearing part 7' and the pressurization of the chamber 6, by engaging with an intermediate part arranged between said bearing part and said bolts. According to a further alternative embodiment not shown, the axis of rotation of the bolts 52 may be attached directly to the wall 63 of the shell of the chamber 6. In the latter case, the axes of rotation act as the bearing part.

Figure 10:
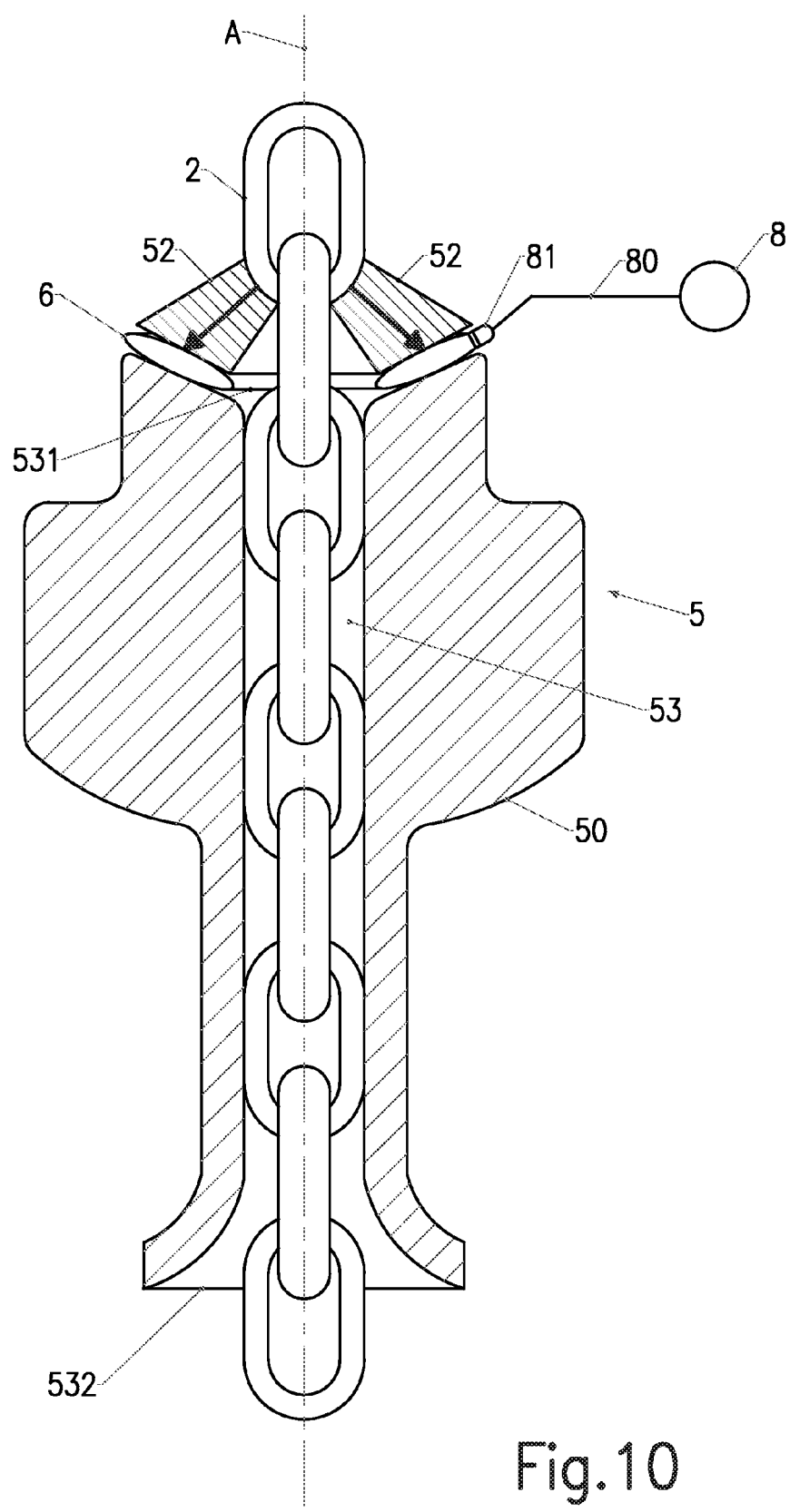
FIG. 10 is a sectional view of a chain stopping device according to the invention, in a further alternative embodiment.

In a further alternative embodiment illustrated in FIG. 10, the bolt 52 engages directly with the wall 63 of the shell of the chamber 6. The bearing surface thereof is directed such that the pressure force exerted by the chain 2 on the bolts 52 is directed in a perpendicular direction to said bearing surface.

Regardless of the design and arrangement adopted for the chamber 6, at least one pressure sensor is configured to measure the pressure of the liquid in said chamber. This pressure sensor 8 may be built into the housing 50 or, on the contrary, remote, or be housed in the thickness of the wall 63 with which the bearing parts 7, 7' engage. It may consist of a pressure gauge or a wired or wireless electronic sensor, configured to measure and communicate, wirelessly and non-powered, the pressure value to an external processor situated for example on the structure 1. It is possible for example to use a wired industrial transmitter such as XYR® marketed by HONYWELL®. A pressure line 80 connects the inside 60 of the chamber 6 to the sensor 8. It is advantageous to provide in the housing 50 and/or on the wall of the shell of the chamber 6, a connection 81 suitable for providing this link between said chamber and the sensor 8. Advantageously, as seen clearly in FIGS. 5 and 8, at least three pressure measurement points 81 are distributed homogeneously (typically at 120°) on the wall of the shell of the chamber 6. This redundancy makes it possible to continuously have a measurement, even if one of the sensors 8 is faulty.

The invention claimed is:

1. Mooring chain stopping device comprising:
a locking housing provided with a channel inside which a mooring chain is capable of sliding, said housing comprising a device connecting to a buoyant structure, which is configured to direct the axis of said channel to the pulling axis of said chain, said housing further having built-in bolts that are configured to inhibit the sliding of said chain in said channel,
a measurement device to measure the tension in said mooring chain and being built into said locking housing,
the measurement device comprising:
at least one chamber consisting of a deformable, closed shell, said chamber being filled with a liquid,
at least one bearing part movably mounted in the locking housing, said bearing part being placed between the bolts and the chamber, said bearing part engaging with the wall of the shell of said chamber so as to pressurize the liquid contained therein, said bearing part being arranged such that the forces exerted by said mooring chain on said bolts cause the movement of said bearing part and the pressurization of said chamber, and
at least one pressure sensor configured to measure the pressure of the liquid in said closed chamber.

2. Device according to claim 1, wherein the bolts engage directly with the bearing part, the bearing part being configured to transfer, onto the wall of the shell of the deformable closed chamber, the forces exerted by the mooring chain on said bolts.

3. Device according to claim 1, wherein the shell of the chamber is thicker at the wall with which the bearing part engages.

4. Device according to claim 1, wherein the shell of the deformable closed chamber is presented in the form of a closed annular body arranged inside or around the channel of the locking housing such that the axis of said body is coaxial with the axis of said channel.

5. Device according to claim 1, wherein the shell of the deformable closed chamber is presented in the form of an open annular body arranged inside or around the channel of the locking housing such that the axis of said body is coaxial with the axis (A) of said channel, the opening of said annular body being sized to allow the passage of a link of the mooring chain.

6. Device according to claim 4, wherein the shell of the deformable closed chamber is advantageously flat, the height of the cross-section of the annular body being less than the width of said cross-section.

7. Device according to claim 1, wherein the shell of the chamber is formed by two identical embossed metal sheets, each having an inner shoulder and an outer shoulder, said chamber being obtained by arranging the two metal sheets facing each other and welding and/or riveting the inner and outer shoulders.

8. Device according to claim 1, wherein the bearing part moves in the locking housing so as to exert, on the wall of the shell of the closed chamber, a pressure force directed in a parallel direction to the axis of the channel.

9. Device according to claim 1, wherein the bearing part moves in the locking housing so as to exert, on the wall of the shell of the closed chamber, a pressure force directed in a perpendicular direction to the axis of the channel.

10. Device according to claim 1, wherein at least three pressure measurement points are distributed homogeneously on the wall of the shell of the deformable closed chamber.

11. Device according to claim 1, wherein the shell of the deformable closed chamber comprises at least one vent for degassing said chamber when filling said chamber with liquid.

12. Device according to claim 1, wherein the chamber is filled with a pressurized liquid so as to maintain a residual pressure in said chamber after the filling thereof.

13. Device according to claim 1, wherein the measurement device comprises a plurality of chambers consisting of deformable closed shells, each of the shells of these chamber being in the form of a portion of annular body arranged inside or around the channel of the housing.

14. System for the offshore mooring of a buoyant structure comprising:
- at least one mooring chain intended to act as a connection between said buoyant structure and an anchoring point in the sea bed,
- a chain stopping device positioned on said buoyant structure, said device comprising a locking housing provided with a channel inside which a mooring chain slides, said housing being connected to said buoyant structure by connection device configured to direct the axis of said channel to the pulling axis of said chain, said housing further having built-in bolts inhibiting the sliding of said chain in said channel,
- a tension measuring device to measure tension in said mooring chain, said measuring device being associated with said locking housing, wherein said measuring device include:
- at least one chamber consisting of a deformable, closed shell, said chamber being filled with a liquid,
- at least one bearing part movably mounted in said locking housing, said bearing part being placed between the bolts and the chamber, said bearing part engaging with the wall of the shell of said chamber so as to pressurize the liquid contained therein, said bearing part being arranged such that the forces exerted by said mooring chain on said bolts cause the movement of said bearing part and the pressurization of said chamber, and
- at least one pressure sensor configured to measure the pressure of the liquid in said closed chamber.

15. System according to claim 14, wherein the bolts engage directly with the bearing part, the latter being configured to transfer, onto the wall of the shell of the deformable closed chamber and in the pulling axis of the mooring chain, the forces exerted by said chain on said bolts.

* * * * *